Patented Nov. 16, 1937

2,099,325

UNITED STATES PATENT OFFICE 2,099,325

PROCESS FOR THE MANUFACTURE OF REACTIVE THORIUM OXIDE AND ITS TRANSFORMATION INTO THORIUM SALTS

Rudolf Zellmann and Richard Müller, Radebeul, Germany, assignors to Chemische Fabrik von Heyden, A. G., Radebeul, near Dresden, Germany, a corporation of Germany No Drawing. Application June 19, 1933, Serial No. 676,532. In Germany June 22, 1932

8 Claims. (Cl. 23—16)

The present invention comprises the manufacture of thorium oxide very capable of reaction and its transformation into thorium salts, especially into thorium nitrate.

In the manufacture of thorium salts starting from thorium oxalate great difficulties arise. Pure thorium oxalate as well as pure thorium oxide, made by heating the former, are but incompletely absorbed in concentrated nitric acid even when boiled.

Pure thorium oxide, made by carefully heating oxalate at 500–600° C. (comp. Zsigmondy, Kolloidchemie II), reacts with acids so as to be peptized, which means that colloidal solutions of thorium oxide, but no solutions of thorium nitrate result. Thorium oxides heated higher are dead-roasted and hardly react with acids at all.

Now we have found, that thorium oxalate decomposes into thorium oxide, carbonic acid and carbon monoxide at essentially lower temperatures than used before. The decomposition pressure of thorium oxalate, as measured in a high vacuum apparatus, is several centimeters of mercury at as low a temperature as 300° C. and therefore sufficient to yield thorium oxide at a relatively fast rate at temperatures from below 500° down to about 300° C. The time required depends on the decomposition temperature. The time of decomposition is about 24 hours at 300° C.

We were surprised to observe that oxides made at such a low temperature are very capable of reaction and are for instance readily absorbed in nitric or hydrochloric acid to form a solution of the corresponding salts. This results the more readily, the lower the temperature to which the oxides were heated. In order to obtain such ready reaction, heating should be continued until the thorium oxalate is almost completely decomposed, but still not too long, since then an "ageing" of the thorium oxide takes place, which can be detected by X-rays and which makes the oxide less reactive.

Thorium oxide made by heating in high vacuum for 24 hours at 300° C. is reacted upon by nitric acid (spec. grav. 1.4) in 25 minutes. Thorium oxide made at the same temperature under normal pressure requires for complete reaction 45 minutes after a 24 hours' heating,
1 hour after a 40 hours' heating,
4 hours after an 86 hours' heating.

It is obvious, that the reactivity is considerably decreased by ageing. An oxide heated at 400° C. for 24 hours reacts still more slowly, the ageing being accelerated by increasing the temperature.

If the oxalate is heated at 300° C. for less than 24 hours, the reaction requires more than 45 minutes, the oxalate being insufficiently decomposed. An optimum of temperature and time of heating exists. This optimum varies according to form and treatment of the thorium oxalate used.

Corresponding conditions prevail with hydrochloric acid, which heretofore was also not considered a reagent for pure thorium oxide.

When a thorium oxide obtained by heating of thorium oxalate to a temperature of about 300° but not more than 500° C., as described before, is examined and photographed with Roentgen rays according to the method of Debye and Scherrer (Chemical Abstracts Volume 11, page 1786), the diagram or photographic plate is devoid of sharp lines. When a thorium oxide of the prior art obtained by heating thorium oxalate to temperatures above 500° C. is examined in the same manner, the diagram or photographic plate shows, by way of contrast, the very sharp lines characteristic of a pronounced structure of the crystal lattice of this oxide. The better the crystals and the order of the lattice, the more pronounced are the interference lines and the more difficult becomes the herein discussed reaction.

According to our new processes energetic new oxides are obtained which prove especially active chemically.

*Example 1*

2 parts of thorium oxalate are heated in vacuo for 24 hours at 300° C. About 1 part of oxide is obtained. This is heated with 2.8 parts of nitric acid (spec. grav. 1.4) with reflux. After 25 minutes the thorium nitrate solution is complete.

*Example 2*

2 parts of thorium oxalate are heated under atmospheric pressure for 24 hours at 300° C. About 1 part of oxide is obtained. This is heated with 2.8 parts of nitric acid (spec. grav. 1.4) with reflux. After 45 minutes reaction to thorium nitrate is complete.

*Example 3*

1 part of the thorium oxide produced according to Example 2 is heated with 2.5 parts of hydrochloric acid (spec. grav. 1.19) with reflux. After about one hour the reaction is completed, resulting in a thorium chloride solution.

What we claim is:

1. Process for the manufacture of thorium oxide very capable of reaction and its transformation into thorium salts, which consists in heating thorium oxalate at temperatures below 500° C. and heating the thorium oxide obtained with acids until the salt is formed.

2. Process for the manufacture of thorium nitrate, which consists in heating thorium oxalate at temperatures below 500° C. and heating the thorium oxide obtained with nitric acid until the salt is formed.

3. Process for the manufacture of highly reactive thorium oxide, comprising heating thorium oxalate to a temperature below 500° C. until it is substantially completely decomposed.

4. Process for the manufacture of highly reactive thorium oxide, comprising decomposing thorium oxalate at a temperature ranging from substantially 300° C. to below 500° C.

5. Process for the manufacture of highly reactive thorium oxide, comprising decomposing thorium oxalate in vacuo at a temperature below 500° C.

6. A highly reactive thorium oxide produced by decomposing thorium oxalate by heat at temperatures ranging below 500° C.

7. As a highly reactive thorium oxide, the residue of decomposition of thorium oxalate at temperatures below 500° C.

8. A highly reactive thorium oxide, prepared by the decomposition of a thorium salt at temperatures substantially below 500° C. which will completely dissolve in an amount of nitric acid of 1.4 specific gravity which acid is not substantially more than ¾ in excess of the stoicheiometrical proportion to form the nitrate when heated with the acid in the open in less than 4 hours.

RUDOLF ZELLMANN.
RICHARD MÜLLER.